(12) United States Patent
Kang et al.

(10) Patent No.: US 10,396,542 B2
(45) Date of Patent: Aug. 27, 2019

(54) BATH SAFETY CONTROL SYSTEM AND BATH SAFETY CONTROL METHOD

(71) Applicant: DARTPOINT TECH. CO., LTD., Taipei (TW)

(72) Inventors: Chi-Lin Kang, New Taipei (TW); Chao-Yuan Huang, Taipei (TW)

(73) Assignee: DARTPOINT TECH. CO., LTD., Taipei (TW)

( * ) Notice: Subject to any disclaimer, the term of this patent is extended or adjusted under 35 U.S.C. 154(b) by 272 days.

(21) Appl. No.: 15/279,451

(22) Filed: Sep. 29, 2016

(65) Prior Publication Data

US 2017/0163022 A1    Jun. 8, 2017

Related U.S. Application Data

(60) Provisional application No. 62/264,345, filed on Dec. 8, 2015.

(30) Foreign Application Priority Data

May 16, 2016    (TW) .............................. 105115093 A

(51) Int. Cl.
   *H02H 3/05*    (2006.01)
   *H05B 1/02*    (2006.01)
   *H01H 47/00*   (2006.01)
   *A47K 3/00*    (2006.01)

(52) U.S. Cl.
   CPC ............ *H02H 3/05* (2013.01); *H05B 1/0252* (2013.01); *A47K 3/001* (2013.01); *H01H 47/002* (2013.01)

(58) Field of Classification Search
   CPC ........ H01H 47/002–005; G01R 31/327–3336; H05B 1/0252–0286
   See application file for complete search history.

(56) References Cited

U.S. PATENT DOCUMENTS 3,766,437 A * 10/1973 Fritts .................... H05B 6/6417
                                                 361/103
5,668,706 A    9/1997 Sakai et al.
(Continued)

FOREIGN PATENT DOCUMENTS

CN       1063876 C      3/2001
CN     101900790 A     12/2010
(Continued)

OTHER PUBLICATIONS

English machine translation of JP2009168404 published Jul. 30, 2009.*

*Primary Examiner* — Rexford N Barnie
*Assistant Examiner* — David A Shiao
(74) *Attorney, Agent, or Firm* — Mark M. Friedman

(57) ABSTRACT

A bath safety control system and a bath safety control method are disclosed. The bath safety control system is electrically coupled to a load and includes a power source, at least one safety relay, an operation relay, a processing unit, and a detecting unit. The processing unit determines whether the operation relay has a fault according to whether the detecting unit is activated. When the processing unit determines that the operation relay has the fault, the processing unit controls the at least one safety relay to be turned off. The bath safety control system and the bath safety control method can enhance the protection of the load.

8 Claims, 5 Drawing Sheets

(56) References Cited

U.S. PATENT DOCUMENTS

| | | | |
|---|---|---|---|
| 6,262,871 B1 * | 7/2001 | Nemir | G01R 31/327 324/424 |
| 8,339,761 B2 | 12/2012 | Yamada et al. | |
| 8,624,749 B2 | 1/2014 | Brochu et al. | |
| 9,671,467 B2 | 6/2017 | Kim | |
| 2005/0045621 A1 | 3/2005 | Chenier | |
| 2007/0061051 A1 | 3/2007 | Maddox | |
| 2007/0205771 A1 | 9/2007 | Drake et al. | |
| 2009/0293192 A1 | 12/2009 | Pons | |
| 2011/0163759 A1 * | 7/2011 | Ishii | H02H 3/162 324/551 |
| 2011/0274450 A1 * | 11/2011 | Atarashi | G03G 15/205 399/37 |
| 2013/0334203 A1 * | 12/2013 | Legatti | H05B 1/0261 219/509 |
| 2014/0016238 A1 * | 1/2014 | Tazaki | H01H 47/002 361/88 |
| 2014/0251979 A1 * | 9/2014 | Hussain | A47L 15/4285 219/509 |
| 2014/0340090 A1 * | 11/2014 | Lothamer | G01R 31/3278 324/418 |
| 2016/0091849 A1 * | 3/2016 | Nishida | G03G 15/5004 399/70 |

FOREIGN PATENT DOCUMENTS

| | | | | |
|---|---|---|---|---|
| DE | 2631785 | A1 * | 4/1977 | H02H 5/083 |
| EP | 1564613 | A2 | 8/2005 | |
| EP | 2940484 | A1 | 11/2015 | |
| JP | 2009168404 | A * | 7/2009 | |
| JP | 5629030 | B1 * | 11/2014 | |
| TW | 389310 | | 5/2000 | |
| TW | 200507045 | | 2/2005 | |
| TW | 201443377 | | 11/2014 | |
| TW | 520131 | | 4/2016 | |

\* cited by examiner

BATH SAFETY CONTROL SYSTEM AND BATH SAFETY CONTROL METHOD

CROSS REFERENCE TO RELATED APPLICATION

This patent application claims priority of U.S. Provisional Application Ser. No. 62/264,345, entitled "Several Controlling Systems for bathing system and methods related to the controlling Systems", which is filed on Dec. 8, 2015, incorporated herein by reference.

BACKGROUND OF THE INVENTION

Field of Invention

The present invention relates to a control field, and more particularly to a bath safety control system and a bath safety control method.

Description of Prior Art

Usually, two relays are electrically coupled between a high-voltage/high-current load and a power source. One of the two relays is a safety relay, and the other is an operation relay. The power source provides power for the load only when both the safety relay and the operation relay are turned on.

When the power source is supplied by electricity, the safety relay is turned on immediately and the operation relay remains turned off. When the load is operated, the operation relay is switched between turned-on and turned-off conditions according to a user's control. When the load stops operating, the safety relay remains turned on to decrease the number of switchings (the number of operations) of the safety relay as long as the power source is supplied by the electricity. When the power source is not supplied by the electricity, both the safety relay and the operation relay are turned off. When the operation relay has a fault, it is necessary to turn off the safety relay to prevent the load from being damaged.

For example, when the operation relay which is electrically coupled to a heater (or a pump) has a fault of sticking contacts, a water temperature is increased after the heater (or the pump) is operated for a long time. When the water temperature is increased to a dangerous temperature, a controller which utilized for controlling the safety relay and the operation relay controls the safety relay and the operation relay which are electrically coupled to the heater (or the pump) to be turned off.

In the above-mentioned safety mechanism of the load, it can be ensured that the safety relay can be successfully turned off every time to stop providing the power for the load because of the minimum number of switchings of the safety relay, especially when the operation relay has the fault of sticking contacts.

However, a situation that the safety relay is not successfully and immediately turned off to stop providing the power for the load may be occur when the operation relay has the fault of sticking contacts. Meanwhile, the load or a system including the load may be damaged.

Consequently, there is a need to provide a safety mechanism to solve the problem that the safety relay is not successfully and immediately turned off to stop providing the power for the load when the operation relay has the fault of sticking contacts in the prior art.

SUMMARY OF THE INVENTION

The present invention provides a bath safety control system and a bath safety control method which can solve the problem that the safety relay is not successfully and immediately turned off to stop providing the power for the load when the operation relay has the fault of sticking contacts in the prior art.

A bath safety control system of the present invention is utilized for being electrically coupled to at least one load and comprises a power source, at least one safety relay, an operation relay, a processing unit, and a detecting unit. The power source has two power source output terminals. The power source is utilized for providing power for the load via the two power source output terminals. The at least one safety relay is electrically coupled between one of the two power source output terminals and the load. The operation relay is electrically coupled between the other one of the two power source output terminals and the load. The processing unit is electrically coupled to the at least one safety relay and the operation relay. The detecting unit comprises at least one input terminal and an output terminal. The at least one input terminal comprises a first input terminal and a second input terminal. The first input terminal is electrically coupled between the power source and the at least one safety relay. The second input terminal is electrically coupled between the load and the operation relay. The output terminal is electrically coupled to the processing unit. The processing unit determines whether the operation relay has a fault according to whether the detecting unit is activated. When the processing unit determines that the operation relay has the fault, the processing unit controls the at least one safety relay to be turned off.

A bath safety control method of the present invention is utilized for a bath safety control system. The bath safety control system is electrically coupled to at least one load and comprises a power source, at least one safety relay, an operation relay, a processing unit, and at least one detecting unit. The power source has two power source output terminals. The power source is utilized for providing power for the load via the two power source output terminals. The at least one safety relay is electrically coupled between one of the two power source output terminals and the load. The operation relay is electrically coupled between the other one of the two power source output terminals and the load. The processing unit is electrically coupled to the at least one safety relay and the operation relay. The bath safety control method comprises steps of: determining, by the processing unit, whether the at least one detecting unit is activated; determining, by the processing unit, whether the operation relay should be turned on when the at least one detecting unit is activated; and controlling, by the processing unit, the at least one safety relay to be turned on or turned off according to whether the operation relay should be turned on.

In the bath safety control system and the bath safety control method of the present invention, the processing unit determines whether the operation relay has a fault according to whether the at least one detecting unit is activated. When the processing unit determines that the operation relay has the fault, the processing unit can control the at least one safety relay to be turned off immediately, thereby preventing the load from being damaged.

DETAILED DESCRIPTION OF THE PREFERRED EMBODIMENTS

Figure 1:
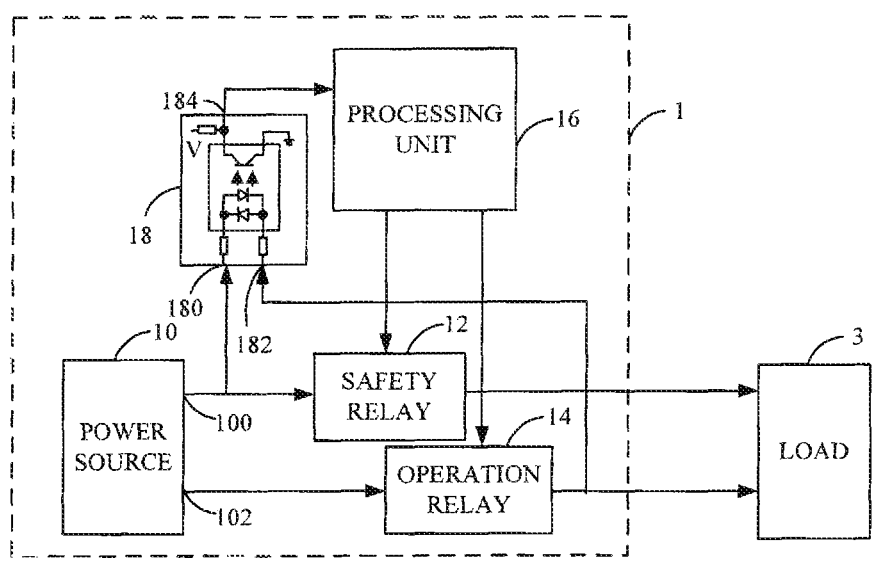
FIG. 1 is a block diagram of a bath safety control system in accordance with a first embodiment of the present invention.

Please refer to FIG. 1. FIG. 1 is a block diagram of a bath safety control system 1 in accordance with a first embodiment of the present invention.

The bath safety control system 1 is utilized for being electrically coupled to at least one load 3 and comprises a power source 10, at least one safety relay 12, an operation relay 14, a processing unit 16, and a detecting unit 18. The load 3 is at least one selected from a group consisting of a heater, a pump, and a blower.

The power source 10 has two power source output terminals 100 and 102. The power source 10 is utilized for providing power for the load 3 via the two power source output terminals 100 and 102. The safety relay 12 is electrically coupled between the power source output terminal 100 (that is, one of the two power source output terminals 100 and 102) and the load 3. The operation relay 14 is electrically coupled between the power source output terminal 102 (that is, the other one of the two power source output terminals 100 and 102) and the load 3. Controlling the safety relay 12 to be turned off can stop providing the power for the load 3, thereby protecting the load 3 (will be described in detail later).

The processing unit 16 is electrically coupled to the safety relay 12 and the operation relay 14. The detecting unit 18 comprises at least one input terminal and an output terminal 184. The at least one input terminal comprises a first input terminal 180 and a second input terminal 182. The first input terminal 180 is electrically coupled between the power source 10 and the safety relay 12. The second input terminal 182 is electrically coupled between the load 3 and the operation relay 14. The output terminal 184 is electrically coupled to the processing unit 16. In the present embodiment, the detecting unit 18 is a photocoupler.

The processing unit 16 determines whether the operation relay 14 has a fault according to whether the detecting unit 18 is activated. When the processing unit 16 determines that the operation relay 14 has the fault, the processing unit 16 can control the safety relay 12 to be turned off immediately. When the safety relay 12 is turned off, the power source 10 stops providing the power for the load 3 to prevent the load 3 from being damaged.

In a first operating mode, when the power source 10 is supplied by electricity from a situation without electricity (e.g., when the bath safety control system 1 is electrically coupled to a mains supply), the safety relay 12 is turned on and the operation relay 14 is turned off.

Situations which may occur when the power source 10 is supplied by the electricity will be described in detail as follows.

When the bath safety control system 1 is operated normally, the operation relay 14 is turned on or turned off according to control of the processing unit 16. The safety relay 12 remains turned on. Specifically, when a user operates the load 3 (e.g., turns on a heater), the processing unit 16 controls the operation relay 14 to be turned on. The first input terminal 180 and the second input terminal 182 of the detecting unit 18 detect that the operation relay 14 is turned on, and thus the detecting unit 18 is activated. The processing unit 16 determines that the operation relay 14 is turned on. If the processing unit 16 determines that the operation relay 14 should be turned on (in fact turned on), it represents that the operation relay 14 is operated normally. Accordingly, a state of the safety relay 12 is not changed. The safety relay 12 remains turned on. Since the safety relay 12 and the operation relay 14 are turned on, the power source 10 can provide the power for the load 3, so that the load 3 can be operated.

When the detecting unit 18 is activated (it represents that the operation relay 14 is turned on), the processing unit 16 determines that the operation relay 14 is turned on. If the processing unit 16 determines that the operation relay 14 should not be turned on (in fact turned on), it represents that the operation relay 14 is operated abnormally. Accordingly, the processing unit 16 changes the state of the safety relay 12. The safety relay 12 is switched to be turned off. Since the safety relay 12 is turned off, the power source 10 stops providing the power for the load 3, so that the load 3 stops operating.

When the detecting unit 18 is not activated (it represents that the operation relay 14 is turned off), the processing unit 16 determines that the operation relay 14 is turned off. If the processing unit 16 determines that the operation relay 14 does not require turning on (in fact is not turned on), it represents that the operation relay 14 is operated normally. Accordingly, the state of the safety relay 12 is not changed. The safety relay 12 remains turned on. Since the safety relay 12 is turned on but the operation relay 14 is turned off, the power source 10 does not provide the power for the load 3, so that the load 3 is not operated.

When the detecting unit 18 is not activated (it represents that the operation relay 14 is turned off), the processing unit 16 determines that the operation relay 14 is turned off. If the processing unit 16 determines that the operation relay 14 requires turning on (in fact is not turned on), the processing unit 16 controls the operation relay 14 to be turned on. Since the safety relay 12 and the operation relay 14 are turned on, the power source 10 can provide the power for the load 3, so that the load 3 is operated.

When the power source 10 is not supplied by the electricity (e.g., when the bath safety control system 1 is electrically disconnected from the mains supply), the safety relay 12 and the operation relay 14 are turned off.

In the first operating mode, when the power source 10 is supplied by the electricity, the processing unit 16 only controls the operation relay 14. The safety relay 12 remains turned on. By decreasing the number of switchings of the safety relay 12, it can be ensured that the safety relay 12 can be successfully turned off every time to stop providing the power for the load 3.

In a second operating mode, when the power source 10 is supplied by electricity from a situation without electricity (e.g., when the bath safety control system 1 is electrically coupled to a mains supply), the safety relay 12 and the operation relay 14 remain turned off.

Situations which may occur when the power source 10 is supplied by the electricity will be described in detail as follows.

When the detecting unit 18 is not activated (it represents that the operation relay 14 is turned off), the processing unit 16 determines that the operation relay 14 is turned off. If the processing unit 16 determines that the operation relay 14 does not require turning on (in fact is not turned on), it represents that the operation relay 14 is operated normally. Accordingly, the state of the safety relay 12 is not changed. The safety relay 12 remains turned off. Since the safety relay 12 and the operation relay 14 are turned off, the power source 10 does not provide the power for the load 3, so that the load 3 is not operated.

When the detecting unit 18 is not activated (it represents that the operation relay 14 is turned off), the processing unit 16 determines that the operation relay 14 is turned off. If the processing unit 16 determines that the operation relay 14 requires turning on (in fact is not turned on), the processing unit 16 controls the safety relay 12 to be turned on firstly and then controls the operation relay 14 to be turned on (e.g., controls the operation relay 14 to be turned on one second later). Since the safety relay 12 and the operation relay 14 are turned on in sequence, the power source 10 can provide the power for the load 3, so that the load 3 is operated.

When the detecting unit 18 is activated (it represents that the operation relay 14 is turned on), the processing unit 16 determines that the operation relay 14 is turned on. If the processing unit 16 determines that the operation relay 14 should be turned on (in fact turned on), it represents that the operation relay 14 is operated normally. Accordingly, the state of the safety relay 12 is not changed. The safety relay 12 remains turned on. Since the safety relay 12 and the operation relay 14 are turned on, the power source 10 can provide the power for the load 3, so that the load 3 is operated.

When the detecting unit 18 is activated (it represents that the operation relay 14 is turned on), the processing unit 16 determines that the operation relay 14 is turned on. If the processing unit 16 determines that the operation relay 14 should not be turned on (in fact turned on), it represents that the operation relay 14 is operated abnormally. Accordingly, the processing unit 16 changes the state of the safety relay 12. The safety relay 12 is switched to be turned off. Since the safety relay 12 is turned off, the power source 10 stops providing the power for the load 3, so that the load 3 stops operating.

When the bath safety control system 1 is operated normally (i.e., the power source 10 is supplied by the electricity) and the operation relay 14 and the safety relay 12 require turning off, the processing unit 16 controls the operation relay 14 to be turned off firstly and then controls the safety relay 12 to be turned off.

In the second operating mode, when the operation relay 14 and the safety relay 12 require turning on, the safety relay 12 is turned on firstly and then the operation relay 14 is turned on. When the operation relay 14 and the safety relay 12 require turning off, the operation relay 14 is turned off firstly and then the safety relay 12 is turned off. An objective of the second operating mode is to prevent sparks from occurring when the safety relay is turned on (closed) or turned off (opened).

In the bath safety control system 1 of the present invention, the processing unit 16 can acquire the turned-on state or turned-off state of the operation relay 14 via the detecting unit 18. Then, the processing unit 16 further determines whether the operation relay 14 should be turned on or turned off. If the operation relay 14 should not be turned on but is turned on in fact, the processing unit 16 controls the safety relay 12 to be turned off. The power source 10 stops providing the power for the load 3 to protect the load 3.

Figure 2:
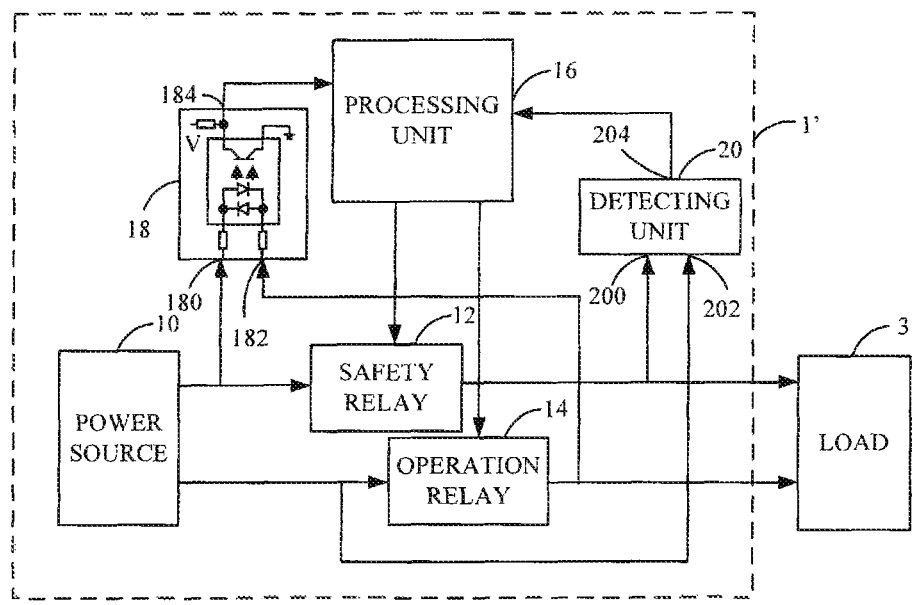
FIG. 2 is a block diagram of a bath safety control system in accordance with a second embodiment of the present invention.

Please refer to FIG. 2. FIG. 2 is a block diagram of a bath safety control system 1' in accordance with a second embodiment of the present invention.

Compared with the first embodiment, the bath safety control system 1' of the present embodiment further comprises another detecting unit 20. The another detecting unit 20 comprises at least one input terminal and an output terminal 204. The at least one input terminal comprises a first input terminal 200 and a second input terminal 202. The first input terminal 200 of the another detecting unit 20 is electrically coupled between the load 3 and the safety relay 12. The second input terminal 202 of the another detecting unit 20 is electrically coupled between the power source 10 and the operation relay 14. The output terminal 204 of the another detecting unit 20 is electrically coupled to the processing unit 16.

In the present embodiment, the another detecting unit 20 can detect that the safety relay 12 is turned on or turned off, thereby enhancing the protection of the load 3. A safety mechanism of the present embodiment can be, referred to the corresponding descriptions in the first embodiment and thus is not repeated herein.

Figure 3:
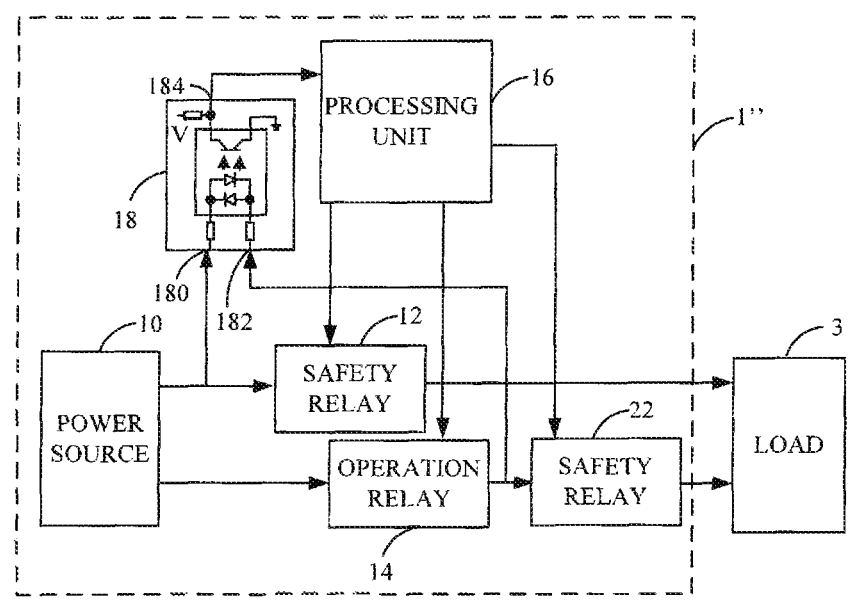
FIG. 3 is a block diagram of a bath safety control system in accordance with a third embodiment of the present invention.

Please refer to FIG. 3. FIG. 3 is a block diagram of a bath safety control system 1" in accordance with a third embodiment of the present invention.

Compared with the first embodiment, the bath safety control system 1" of the present embodiment further comprises another safety relay 22 which is electrically coupled between the operation relay 14 and the load 3.

In the present embodiment, the another safety relay 22 can enhance the protection of the load 3. A safety mechanism of the present embodiment can be referred to the corresponding descriptions in the first embodiment and thus is not repeated herein.

Figure 4:
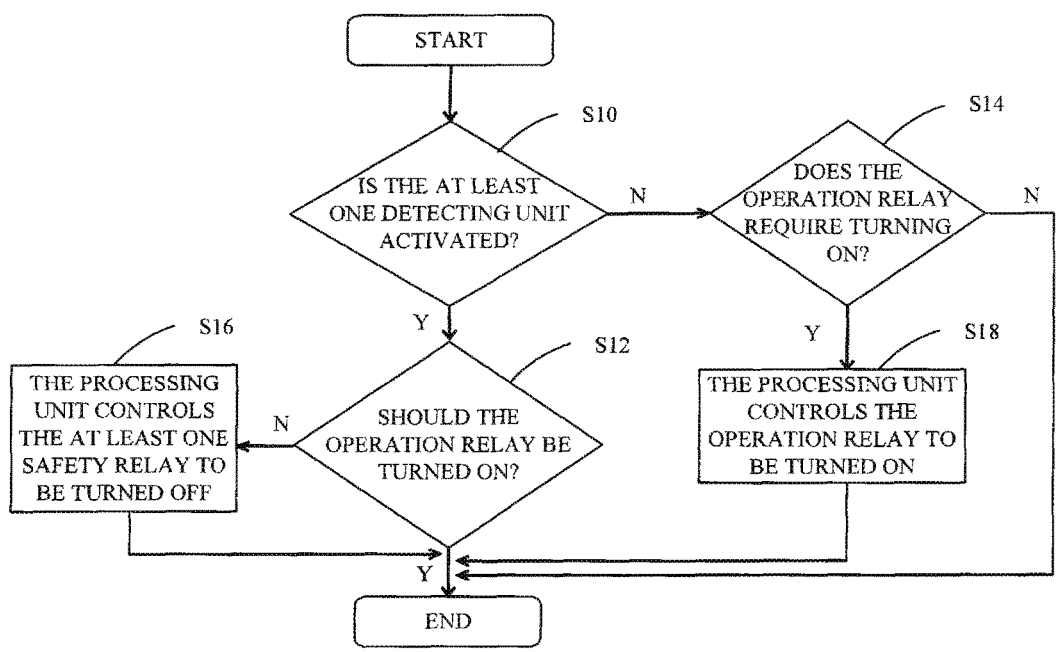
FIG. 4 is a flow chart of a bath safety control method in accordance with a first operating mode of the present invention.

Please refer to FIG. 4. FIG. 4 is a flow chart of a bath safety control method in accordance with a first operating mode of the present invention.

The bath safety control method is utilized for a bath safety control system. The bath safety control system is electrically coupled to at least one load and comprises a power source, at least one safety relay, an operation relay, a processing unit, and at least one detecting unit. The power source has two power source output terminals. The power source is utilized for providing power for the load via the two power source output terminals. The at least one safety relay is electrically coupled between one of the two power source output terminals and the load. The operation relay is electrically coupled between the other one of the two power source output terminals and the load. The processing unit is electrically coupled to the at least one safety relay and the operation relay. The bath safety control method comprises the following steps.

In step S10, the processing unit determines whether the at least one detecting unit is activated. If yes, step S12 is performed. If no, step S14 is performed.

In step S12, the processing unit determines whether the operation relay should be turned on. If yes, the method ends. If no, step S16 is performed.

In step S14, the processing unit determines whether the operation relay requires turning on. If yes, step S18 is performed. If no, the method ends.

In step S16, the processing unit controls the at least one safety relay to be turned off.

In step S18, the processing unit controls the operation relay to be turned on.

Figure 5:
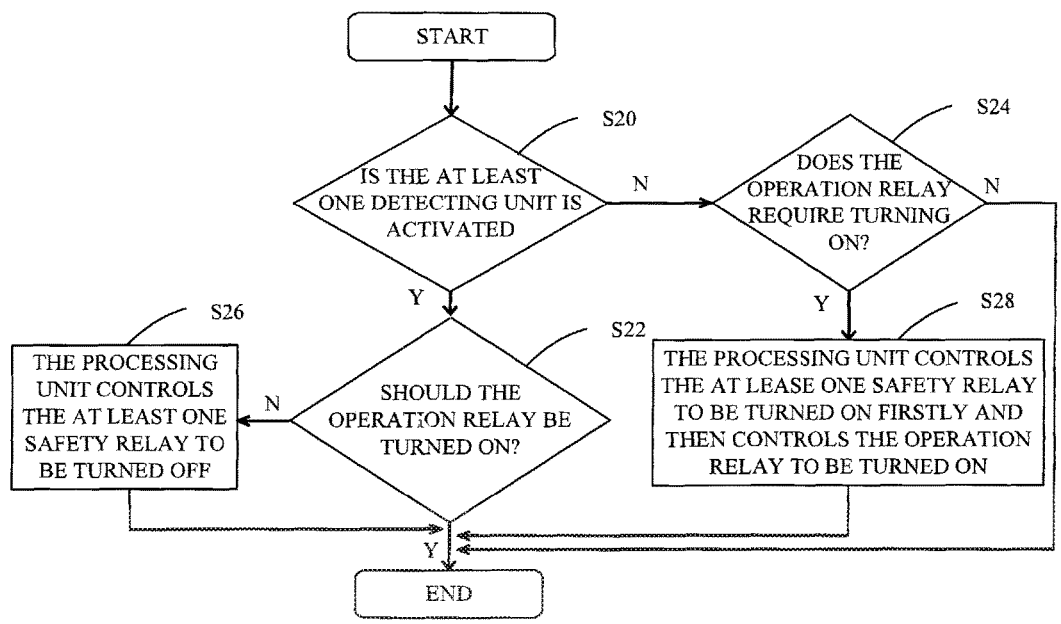
FIG. 5 is a flow chart of a bath safety control method in accordance with a second operating mode of the present invention.

Please refer to FIG. 5. FIG. 5 is a flow chart of a bath safety control method in accordance with a second operating mode of the present invention.

In step S20, the processing unit determines whether the at least one detecting unit is activated. If yes, step S22 is performed. If no, step S24 is performed.

In step S22, the processing unit determines whether the operation relay should be turned on. If yes, the method ends. If no, step S26 is performed.

In step S24, the processing unit determines whether the operation relay requires turning on. If yes, step S28 is performed. If no, the method ends.

In step S26, the processing unit controls the at least one safety relay to be turned off.

In step S28, the processing unit controls the at least one safety relay to be turned on firstly and then controls the operation relay to be turned on.

In the bath safety control system and the bath safety control method of the present invention, the processing unit determines whether the operation relay has a fault according to whether the at least one detecting unit is activated. When the processing unit determines that the operation relay has the fault, the processing unit can control the at least one safety relay to be turned off immediately, thereby preventing the load from being damaged.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A bath safety control system electrically coupled to at least one load, the bath safety control system comprising:

a power source having two power source output terminals, the power source providing power for the load via the two power source output terminals;

at least one safety relay electrically coupled between one of the two power source output terminals and the load;

an operation relay electrically coupled between the other one of the two power source output terminals and the load;

a processing unit electrically coupled to the at least one safety relay and the operation relay; and a detecting unit comprising at least one input terminal and an output terminal, the at least one input terminal comprising a first input terminal and a second input terminal, the first input terminal electrically coupled between the power source and the at least one safety relay, the second input terminal electrically coupled between the load and the operation relay, the output terminal electrically coupled to the processing unit, wherein the processing unit determines whether the operation relay has a fault according to whether the detecting unit is activated, when the processing unit determines that the operation relay has the fault, the processing unit controls the at least one safety relay to be turned off;

when the detecting unit is activated, the processing unit determines that the operation relay is turned on; and when the detecting unit is not activated, the processing unit determines that the operation relay is turned off;

wherein in a first operating mode of the bath safety control system, when the power source is supplied by electricity from a situation without electricity, the at least one safety relay is turned on and the operation relay is turned off;

when the bath safety control system is operated normally, the operation relay is turned on or turned off according to control of the processing unit and the at least one safety relay remains turned on;

and in the first operating mode, when the bath safety control system is operated normally, when the detecting unit is activated and the processing unit determines that the operation relay should be turned on, the processing unit does not change a state of the at least one safety relay from being turned on;

when the detecting unit is activated and the processing unit determines that the operation relay should not be turned on, the processing unit changes the state of the at least one safety relay to an off state;

when the detecting unit is not activated and the processing unit determines that the operation relay does not require turning on, the processing unit does not change the state of the at least one safety relay from being turned on;

when the detecting unit is not activated and the processing unit determines that the operation relay requires turning on, the processing unit controls the operation relay to be turned on;

wherein in a second operating mode of the bath safety control system, when the power source is supplied by electricity from a situation without electricity, the at least one safety relay and the operation relay remain turned off, when the operation relay and the at least one safety relay require turning on, the at least one safety relay is turned on firstly and then the operation relay is turned on;

when the operation relay and the at least one safety relay require turning off, the operation relay is turned off firstly and then the at least one safety relay is turned off;

and in the second operating mode, when the detecting unit is not activated and the processing unit determines that the operation relay does not require turning on, the processing unit does not change the state of the at least one safety relay from being turned off;

and in the second operating mode, when the detecting unit is not activated and the processing unit determines that the operation relay requires turning on, the processing unit controls the at least one safety relay to be turned on firstly and then controls the operation relay to be turned on;

and in the second operating mode, when the detecting unit is activated and the processing unit determines that the operation relay should be turned on, the processing unit does not change the state of the at least one safety relay from being turned on;

and in the second operating mode, when the detecting unit is activated and the processing unit determines that the operation relay should not be turned on, the processing unit changes the state of the at least one safety relay to the off state.

2. The bath safety control system of claim 1, wherein the detecting unit is a photocoupler.

3. The bath safety control system of claim 1, further comprising another detecting unit, the another detecting unit comprising at least one input terminal and an output terminal, the at least one input terminal comprises a first input terminal and a second input terminal, the first input terminal of the another detecting unit electrically coupled between the load and the at least one safety relay, the second input terminal of the another detecting unit electrically coupled between the power source and the operation relay, and the output terminal of the another detecting unit electrically coupled to the processing unit.

4. The bath safety control system of claim 3, wherein the another detecting unit is a photocoupler.

5. The bath safety control system of claim 1, wherein when the power source is not supplied by electricity, the at least one safety relay and the operation relay are turned off.

6. The bath safety control system of claim 1, further comprising another safety relay electrically coupled between the operation relay and the load.

7. The bath safety control system of claim 1, wherein the load is at least one selected from a group consisting of a heater, a pump, and a blower.

8. A bath safety control method, utilized for a bath safety control system, the bath safety control system electrically coupled to at least one load and comprising a power source, at least one safety relay, an operation relay, a processing unit, and at least one detecting unit, the power source having two power source output terminals, the power source providing power for the load via the two power source output terminals, the at least one safety relay electrically coupled between one of the two power source output terminals and the load, the operation relay electrically coupled between the other one of the two power source output terminals and the load, the processing unit electrically coupled to the at least one safety relay and the operation relay, wherein the bath safety control method comprises steps of:

determining, by the processing unit, whether the at least one detecting unit is activated;

determining, by the processing unit, whether the operation relay should be turned on when the at least one detecting unit is activated; and controlling, by the processing unit, the at least one safety relay to be turned on or turned off according to whether the operation relay should be turned on;

when the detecting unit is activated, the processing unit determines that the operation relay is turned on; and when the detecting unit is not activated, the processing unit determines that the operation relay is turned off;

wherein in a first operating mode of the bath safety control system, when the power source is supplied by electricity from a situation without electricity, the at least one safety relay is turned on and the operation relay is turned off;

when the bath safety control system is operated normally, the operation relay is turned on or turned off according to control of the processing unit and the at least one safety relay remains turned on;

and in the first operating mode, when the bath safety control system is operated normally, when the detecting unit is activated and the processing unit determines that the operation relay should be turned on, the processing unit does not change a state of the at least one safety relay from being turned on;

when the detecting unit is activated and the processing unit determines that the operation relay should not be turned on, the processing unit changes the state of the at least one safety relay to an off state;

when the detecting unit is not activated and the processing unit determines that the operation relay does not require turning on, the processing unit does not change the state of the at least one safety relay from being turned on;

when the detecting unit is not activated and the processing unit determines that the operation relay requires turning on, the processing unit controls the operation relay to be turned on;

wherein in a second operating mode of the bath safety control system, when the power source is supplied by electricity from a situation without electricity, the at least one safety relay and the operation relay remain turned off, when the operation relay and the at least one safety relay require turning on, the at least one safety relay is turned on firstly and then the operation relay is turned on;

when the operation relay and the at least one safety relay require turning off, the operation relay is turned off firstly and then the at least one safety relay is turned off;

and in the second operating mode, when the detecting unit is not activated and the processing unit determines that the operation relay does not require turning on, the processing unit does not change the state of the at least one safety relay from being turned off;

and in the second operating mode, when the detecting unit is not activated and the processing unit determines that the operation relay requires turning on, the processing unit controls the at least one safety relay to be turned on firstly and then controls the operation relay to be turned on;

and in the second operating mode, when the detecting unit is activated and the processing unit determines that the operation relay should be turned on, the processing unit does not change the state of the at least one safety relay from being turned on;

and in the second operating mode, when the detecting unit is activated and the processing unit determines that the operation relay should not be turned on, the processing unit changes the state of the at least one safety relay to the off state.

* * * * *